United States Patent
Yeon

(10) Patent No.: US 11,852,252 B2
(45) Date of Patent: Dec. 26, 2023

(54) MULTI-WAY VALVE

(71) Applicant: Hyundai WIA Corporation, Changwon-si (KR)

(72) Inventor: Je Min Yeon, Suwon-si (KR)

(73) Assignee: Hyundai WIA Corporation, Changwon-si (KR)

( * ) Notice: Subject to any disclaimer, the term of this patent is extended or adjusted under 35 U.S.C. 154(b) by 0 days.

(21) Appl. No.: 17/806,700

(22) Filed: Jun. 13, 2022

(65) Prior Publication Data

US 2022/0397204 A1 Dec. 15, 2022

(30) Foreign Application Priority Data

Jun. 15, 2021 (KR) .................. 10-2021-0077510

(51) Int. Cl.
*F16K 11/085* (2006.01)
*F16K 27/00* (2006.01)

(52) U.S. Cl.
CPC ........ *F16K 11/0853* (2013.01); *F16K 27/003* (2013.01)

(58) Field of Classification Search
CPC ............ F16K 11/0876; F16K 11/0853; F16K 11/0856; F16K 27/003; F01P 2007/146; Y10T 137/86823; B60H 1/00885
See application file for complete search history.

(56) References Cited

U.S. PATENT DOCUMENTS

| | | | | |
|---|---|---|---|---|
| 1,529,492 | A * | 3/1925 | Marteka | F16K 11/085 |
| | | | | 137/625.41 |
| 6,196,266 | B1* | 3/2001 | Breda | F16K 11/0853 |
| | | | | 137/454.6 |
| 10,221,952 | B2* | 3/2019 | Yoo | F16K 11/0856 |
| 10,344,877 | B2* | 7/2019 | Roche | B60L 58/26 |
| 11,168,797 | B2* | 11/2021 | Dragojlov | F16K 31/535 |

FOREIGN PATENT DOCUMENTS

KR  10-2018-0072781 A  6/2018

* cited by examiner

*Primary Examiner* — Michael R Reid
(74) *Attorney, Agent, or Firm* — Knobbe, Martens, Olson & Bear, LLP

(57) ABSTRACT

A multi-way valve includes a valve housing and a valve body. The valve housing has an inner space formed therein, and includes a plurality of coolant inlet ports spaced apart from each other along a side surface thereof and a coolant outlet port penetrated along a central axis thereof. The valve body is inserted into the valve housing and rotates around a rotation axis thereof coincident with or parallel to the central axis of the valve housing. The valve body includes a plurality of inlet parts spaced apart from each other along a side surface thereof and an outlet part formed along the rotation axis thereof, the inlet parts and the outlet part communicating with each other, the outlet part facing the coolant outlet port to be connected thereto, the inlet part being selectively connected to the coolant inlet port by rotation thereof around the rotation axis thereof.

13 Claims, 5 Drawing Sheets

<C-C>

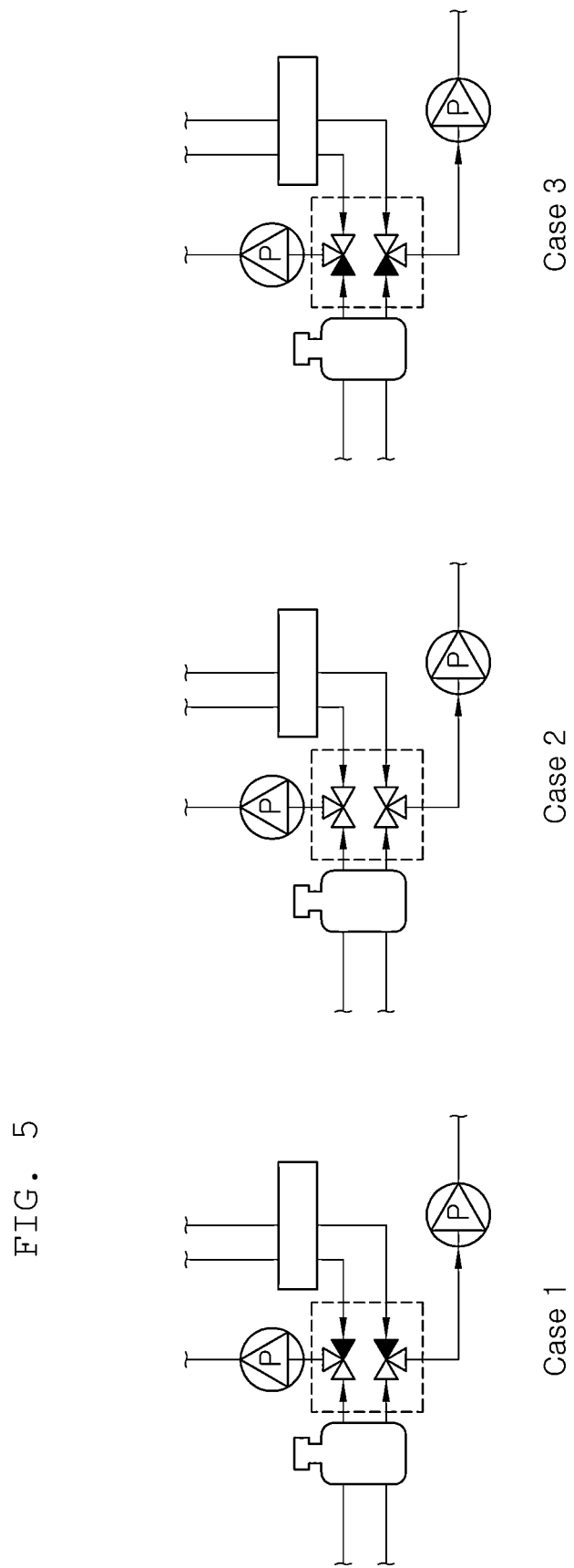

MULTI-WAY VALVE

CROSS-REFERENCE TO THE RELATED APPLICATION

This application claims priority from Korean Patent Application No. 10-2021-0077510, filed on Jun. 15, 2021, in the Korean Intellectual Property Office, the disclosure of which is incorporated herein by reference in its entirety.

BACKGROUND

1. Field

The present disclosure relates to a multi-way valve for use in a vehicle.

2. Description of the Related Art

A large number of multi-way valves are used at the point where a plurality of flow paths join or branch in a coolant line inside a vehicle. When each of the closed circuits is provided in a corresponding one of opposite sides of a multi-way valve in a coolant line, a reservoir tank may be required to be provided for each of the closed circuits on the opposite sides of the multi-way valve, thereby making it possible to remove cavitation generated in the coolant line.

Cavitation is a phenomenon in which the static pressure in a certain portion of flowing water is reduced below the vapor pressure corresponding to the temperature of the water, leading to water evaporation and the formation of vapor-filled cavities in water. Cavitation is a significant cause of noise, vibration, and blade erosion.

The information disclosed in this Background of the disclosure section is only for enhancement of understanding of the general background of the disclosure, and should not be taken as an acknowledgement or any form of suggestion that this information forms the related art already known to a person skilled in the art.

SUMMARY

In a multi-way valve according to an example, an additional reservoir tank and piping may be provided in order to eliminate the cavitation, which results in increased manufacturing costs. Accordingly, when maintenance is required, it is more time-consuming and difficult.

Therefore, it may be required to develop a multi-way valve capable of eliminating cavitation generated at two closed circuits, each of which is connected to a corresponding one of opposite sides of the multi-way valve, using only one reservoir provided in either one of the two closed circuits.

The present disclosure relates to a multi-way valve including a valve housing having a plurality of inlet ports and an outlet port formed therein and a valve body configured to selectively connect the plurality of inlet ports to the outlet port by rotation thereof in the inner space of the valve housing.

An aspect of the present disclosure to provide a multi-way valve including a valve housing including a plurality of inlet ports and an outlet port and a valve body configured to selectively connect the plurality of inlet ports to the outlet port by rotation thereof in the inner space of the valve housing. In embodiments, all of the plurality of inlet ports, each of which is connected to a closed circuit inside a vehicle, may be connected to the outlet port by the rotation of the valve body, thereby entering a fully open state. During the fully open state, it is possible to eliminate cavitation in a coolant line through a reservoir.

In accordance with the present disclosure, provided is a multi-way valve including a valve housing having an inner space formed therein, the valve housing including a plurality of coolant inlet ports formed to be spaced apart from each other along a side surface thereof and a coolant outlet port formed to be penetrated along a central axis thereof orthogonal to the coolant inlet port, and a valve body inserted into the inner space of the valve housing and configured to rotate around a rotation axis thereof coincident with or parallel to the central axis of the valve housing, the valve body including a plurality of inlet parts formed to be spaced apart from each other along a side surface thereof and an outlet part formed along the rotation axis thereof, the inlet part and the outlet part communicating with each other therein, the outlet part facing the coolant outlet port to be constantly connected thereto, the inlet part being selectively connected to the coolant inlet port by rotation thereof around the rotation axis thereof.

The coolant inlet port of the valve housing may include a first inlet port and a second inlet port, the coolant outlet port may include a first outlet port, and a first closed circuit, configured to allow a coolant flowing out through the first outlet port to flow into the valve housing through the first inlet port, and a second closed circuit, configured to allow the coolant flowing out through the first outlet port to flow into the valve housing through the second inlet port, may be connected to each other.

The valve housing may have any one of the first inlet port and the second inlet port connected to the first outlet port by the rotation of the valve body, or may have both the first inlet port and the second inlet port connected to the first outlet port by the rotation thereof.

Any one of the first inlet port and the second inlet port of the valve housing may be connected to a reservoir in a coolant line, and cavitation in the coolant line may be eliminated using the reservoir when both the first inlet port and the second inlet port are connected to the first outlet port.

The valve housing may include a first housing including a first inlet port, a second inlet port, and a first outlet port formed therein, and a second housing including a third inlet port, a fourth inlet port, and a second outlet port formed therein.

The first inlet port, the second inlet port, and the first outlet port formed in the first housing may be connected to a coolant line in a vehicle electronic driving unit, and the third inlet port, the fourth inlet port, and the second outlet port formed in the second housing may be connected to a coolant line in a vehicle battery.

The coolant inlet port of the valve housing may include a first inlet port and a second inlet port, into each of which a coolant flows, and the inlet part of the valve body may include a first inlet part, opened toward the first inlet port, and a second inlet part, opened toward the second inlet port, around the outlet part of the valve body.

The valve body may be fully opened when the first inlet part and the first inlet port are aligned with each other and the second inlet part and the second inlet port are aligned with each other, and one of the first inlet port and the second inlet port may be selectively opened when the valve body rotates toward the first inlet port in a fully open state thereof so that the second inlet part is aligned with the first inlet port or rotates toward the second inlet port in the fully open state thereof so that the first inlet part is aligned with the second inlet port.

The valve body may include a plurality of rotation protrusions, formed to be spaced apart from each other, on a rim of an upper surface thereof or a lower surface thereof, and the plurality of rotation protrusions may be rotationally supported on an inner wall of the valve housing when the valve body rotates.

The valve housing may include a plurality of valve seals, provided on sides of the plurality of coolant inlet ports or on an inner wall thereof, in the inner space thereof, and the plurality of valve seals may be spaced apart from each other along the inner wall of the valve housing and may be configured to be aligned with the plurality of inlet parts when the valve body rotates, thereby preventing a coolant from flowing into the inner space of the valve housing.

The outlet part of the valve body may be formed to have a cross-sectional area larger than that of the coolant outlet port of the valve housing.

The outlet part of the valve body may have a central axis offset from the central axis of the coolant outlet port of the valve housing.

The coolant inlet port of the valve housing may include a first inlet port and a second inlet port having a coolant flowing thereinto from one side thereof, and a third inlet port and a fourth inlet port having a coolant flowing thereinto from the other side thereof, the coolant outlet port may include a first outlet port, and the first inlet port, the second inlet port, the third inlet port, or the fourth inlet port may be selectively connected to the first outlet port by the rotation of the valve body.

BRIEF DESCRIPTION OF THE DRAWINGS

The above and other features, and other advantages of the present disclosure will be more clearly understood from the following detailed description taken in conjunction with the accompanying drawings, in which:

FIG. 5 is a view showing the case in which the multi-way valve according to the embodiment of the present disclosure is operated by being connected to a coolant line in a vehicle.

DETAILED DESCRIPTION OF EMBODIMENTS

Figure 1:
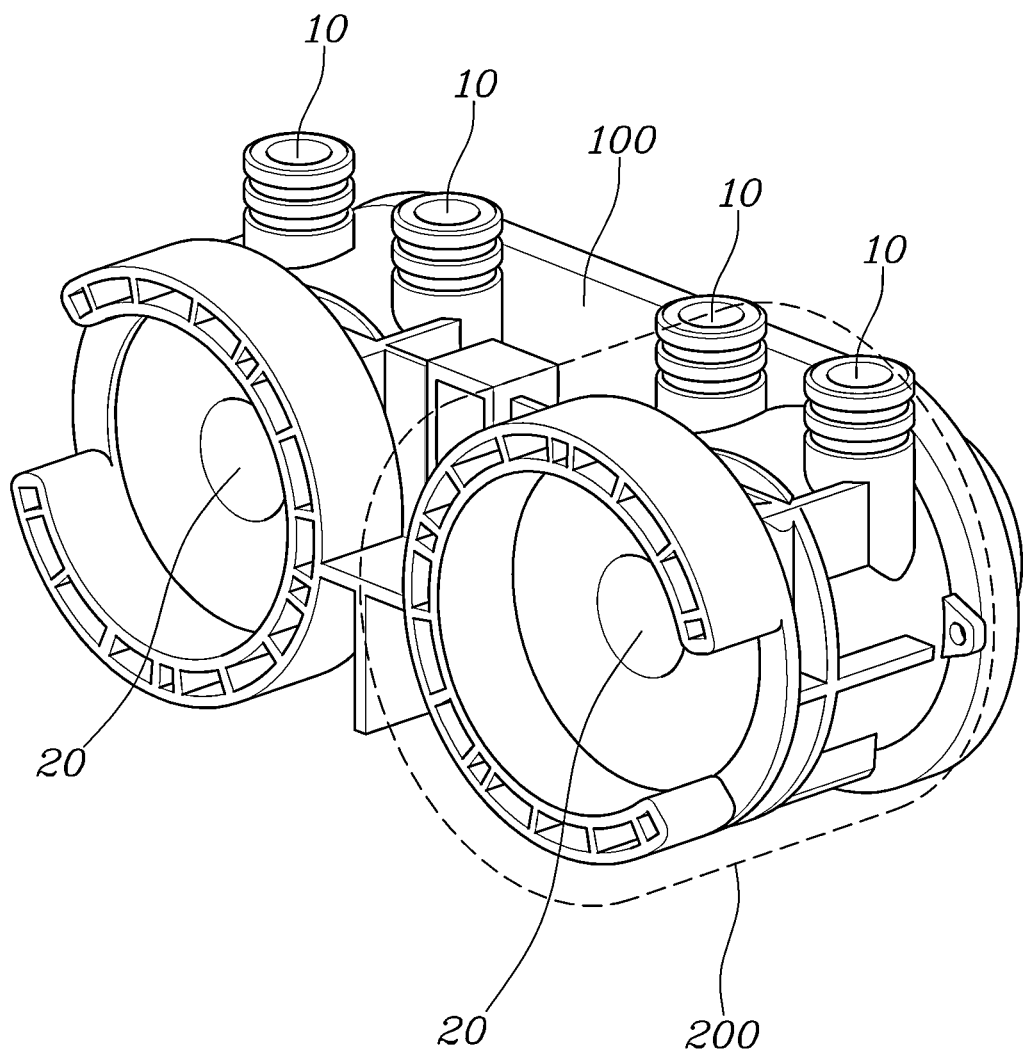
FIG. 1 is a view showing a multi-way valve according to an embodiment of the present disclosure.
Figure 2:
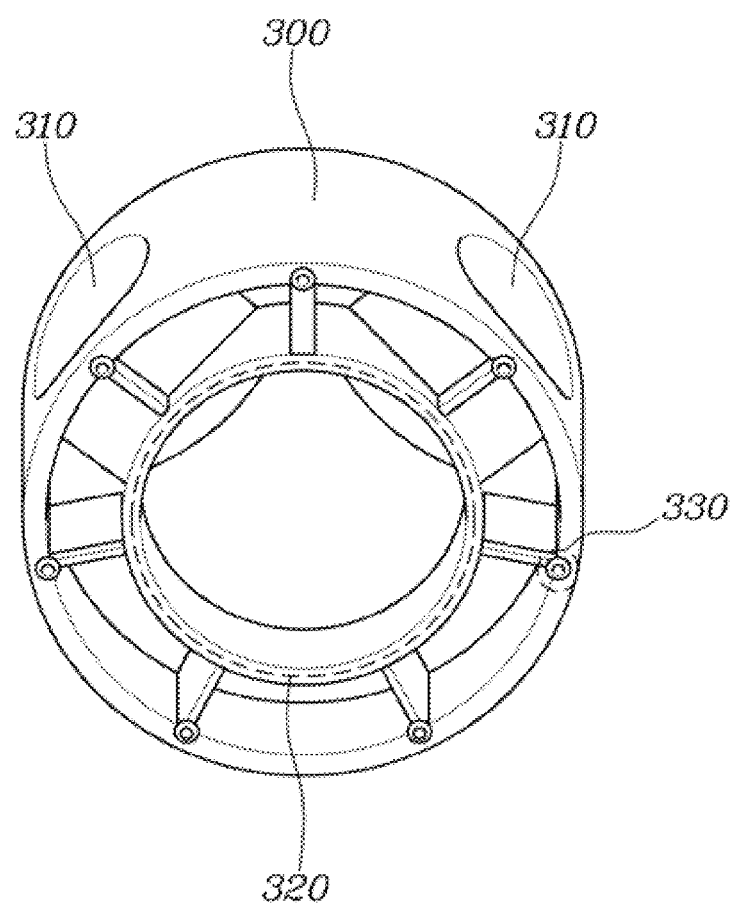
FIG. 2 is a view showing a valve body of the multi-way valve according to the embodiment of the present disclosure.
Figure 3:
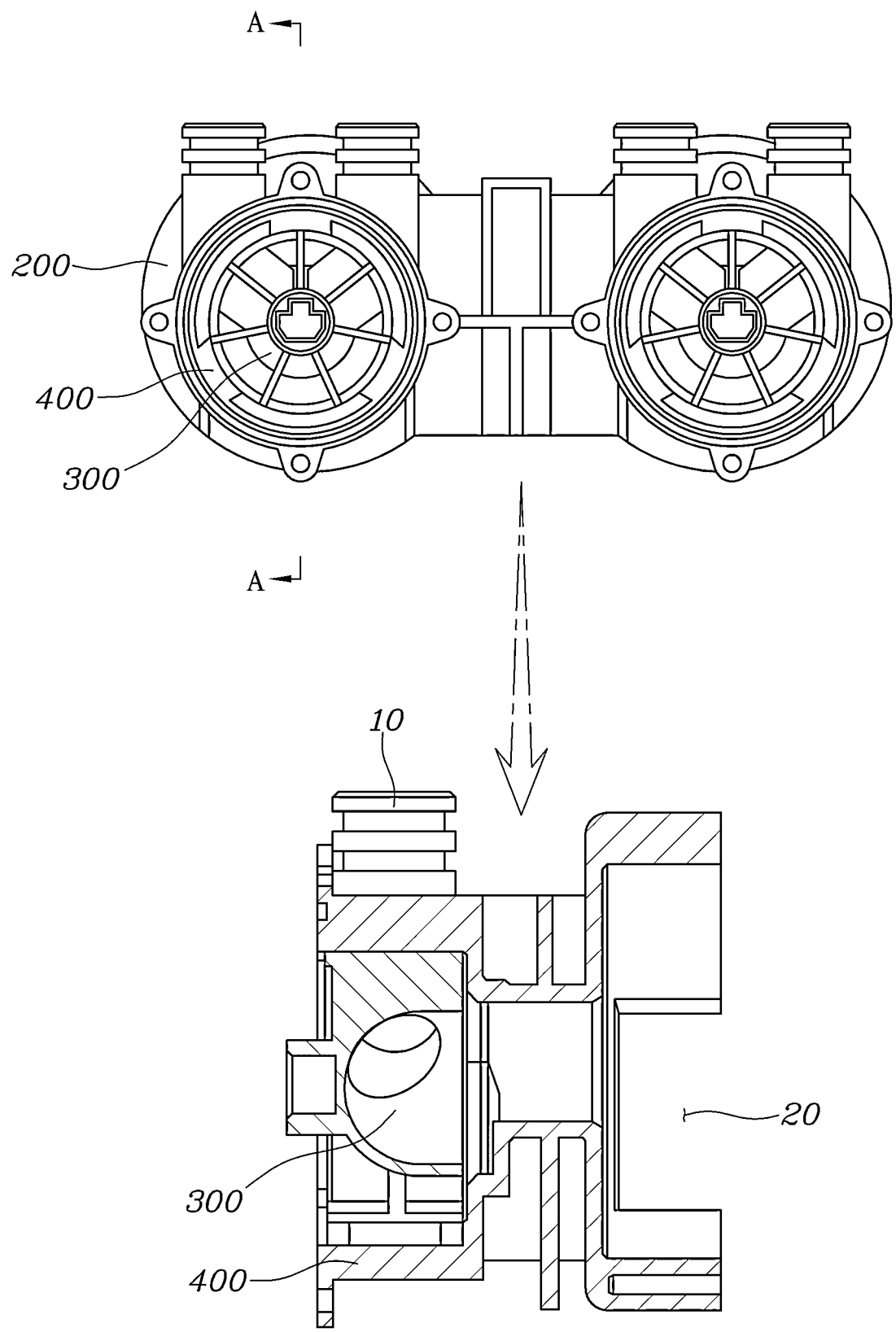
FIGS. 3 and 4 are cross-sectional views showing the multi-way valve and the valve body according to the embodiment of the present disclosure.
Figure 4:
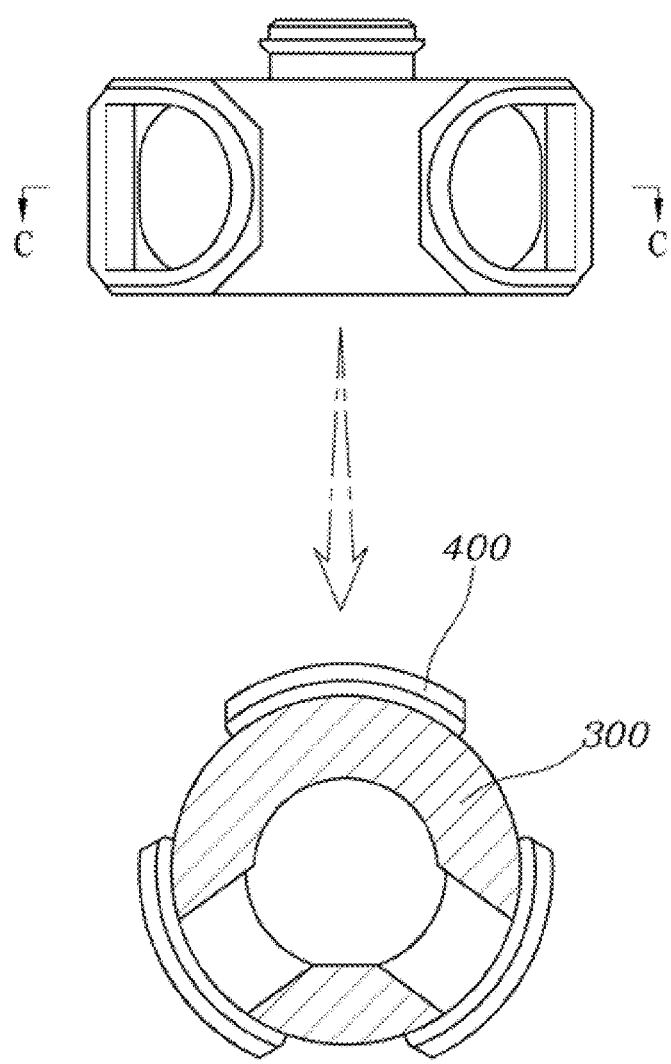

FIG. 1 is a view showing a multi-way valve according to an embodiment of the present disclosure. FIG. 2 is a view showing a valve body of the multi-way valve according to the embodiment of the present disclosure. FIGS. 3 and 4 are cross-sectional views showing the multi-way valve and the valve body according to the embodiment of the present disclosure. FIG. 5 is a view showing the case in which the multi-way valve according to the embodiment of the present disclosure is operated by being connected to a coolant line in a vehicle.

FIG. 1 is a view showing the multi-way valve 100 according to the embodiment of the present disclosure. FIG. 2 is a view showing the valve body 300 of the multi-way valve according to the embodiment of the present disclosure. The multi-way valve according to the embodiment of the present disclosure includes a valve housing 200 having an inner space formed therein, the valve housing 200 including a plurality of coolant inlet ports 10 formed to be spaced apart from each other along a side surface thereof and a coolant outlet port 20 formed to be penetrated along a central axis thereof orthogonal to the coolant inlet port 10, and a valve body 300 inserted into the inner space of the valve housing 200 and configured to rotate around a rotation axis thereof coincident with or parallel to the central axis of the valve housing 200, the valve body 300 including a plurality of inlet parts 310 formed to be spaced apart from each other along a side surface thereof and an outlet part 320 formed along the rotation axis thereof, the inlet part 310 and the outlet part 320 communicating with each other therein, the outlet part 320 facing the coolant outlet port 20 to be constantly connected thereto, the inlet part 310 being selectively connected to the coolant inlet port 10 by rotation thereof around the rotation axis thereof. When the inlet part 310 is connected to the coolant inlet port 10, the inlet part 310 is in fluid communication with the inlet port 10, and the inlet port 10 and the outlet port 20 are in fluid communication with each other via the inlet part 310 and the outlet part 320.

In the multi-way valve according to the embodiment of the present disclosure, a coolant line (closed circuit) in a vehicle is connected to each of the coolant inlet ports 10. Accordingly, a plurality of coolant inlet ports 10 are selectively opened, or all of the coolant inlet ports 10 are opened (fully opened). In this manner, it is not necessary to provide a reservoir configured to eliminate cavitation for each closed circuit in the coolant line, thereby making it possible to eliminate cavitation in the coolant line through a fully-opening function using only one reservoir.

FIG. 5 is a view showing the case in which the multi-way valve according to the embodiment of the present disclosure is operated by being connected to the coolant line in the vehicle. In the multi-way valve according to the embodiment of the present disclosure, the coolant inlet port 10 of the valve housing 200 includes a first inlet port and a second inlet port. The coolant outlet port 20 includes a first outlet port. A first closed circuit, configured to allow a coolant flowing out through the first outlet port to flow into the valve housing 200 through the first inlet port, and a second closed circuit, configured to allow the coolant flowing out through the first outlet port to flow into the valve housing 200 through the second inlet port, may be connected to each other.

In addition, in the multi-way valve according to the embodiment of the present disclosure, the valve housing 200 may have any one of the first inlet port and the second inlet port connected to the first outlet port by the rotation of the valve body 300, or may have both the first inlet port and the second inlet port connected to the first outlet port by the rotation thereof.

Meanwhile, in the multi-way valve according to the embodiment of the present disclosure, any one of the first inlet port and the second inlet port of the valve housing 200 may be connected to the reservoir in the coolant line, and cavitation in the coolant line may be eliminated using the reservoir when both the first inlet port and the second inlet port are connected to the first outlet port.

In addition, in the multi-way valve according to the embodiment of the present disclosure, the valve housing 200 may include a first housing, in which a first inlet port, a second inlet port, and a first outlet port are formed, and a second housing, in which a third inlet port, a fourth inlet port, and a second outlet port are formed.

Meanwhile, in the multi-way valve according to the embodiment of the present disclosure, the first inlet port, the second inlet port, and the first outlet port formed in the first housing may be connected to a coolant line in a vehicle electronic driving unit, and the third inlet port, the fourth inlet port, and the second outlet port formed in the second housing may be connected to a coolant line in a vehicle battery.

Specifically, FIG. 3 shows a multi-way valve in which two valve housings 200 are integrated with each other. In this case, each of the valve housings 200 is located on a corresponding one of the coolant line in the vehicle electronic driving unit and the coolant line in the vehicle battery. In embodiments, referring to FIG. 5, a portion connected to a coolant pump corresponds to the coolant outlet port 20 of each of the valve housings 200, and the coolant outlet port 20 and each coolant inlet port 10 form a closed circuit through which the coolant circulates on opposite sides of the multi-way valve.

In embodiments, a coolant discharged from the reservoir flows into the coolant inlet port 10 on the left side. In this case, during fully open operation of the valve (CASE 2 in FIG. 5), cavitation in the closed circuits formed in the opposite sides thereof may be eliminated simultaneously using the reservoir. In embodiments, the coolant in each flow path may be allowed to flow into the reservoir by the fully open operation of the valve, and cavitation in the coolant line may be eliminated by performing an air-bleeding function inside the reservoir.

FIGS. 3 and 4 are cross-sectional views showing the multi-way valve and the valve body according to the embodiment of the present disclosure. In the multi-way valve according to the embodiment of the present disclosure, the coolant inlet port 10 of the valve housing 200 may include the first inlet port and the second inlet port, each of which has the coolant flowing thereinto, and the inlet part 310 of the valve body 300 may include a first inlet part 310, opened toward the first inlet port, and a second inlet part 310, opened toward the second inlet port, around the outlet part 320.

Referring to FIG. 3, the first inlet part 310 and the second inlet part 310 are opened toward the coolant inlet port 10 around the outlet part 320, and the first inlet part 310 and the second inlet part 310 are formed at an angle of about 120 degrees. In embodiments, when the coolant inlet port 10 communicates with the first inlet part 310 or the second inlet part 310 of the valve body 300, the port is opened so as to allow a coolant to flow therethrough.

Specifically, in the multi-way valve according to the embodiment of the present disclosure, the valve body 300 is fully opened when the first inlet part 310 and the first inlet port are aligned with each other and the second inlet part 310 and the second inlet port are aligned with each other. Meanwhile, when the valve body 300 rotates toward the first inlet port in the fully open state thereof so that the second inlet part 310 is aligned with the first inlet port or rotates toward the second inlet port in the fully open state thereof so that the first inlet part 310 is aligned with the second inlet port, one of the first inlet port and the second inlet port may be selectively opened.

Additionally, in the multi-way valve according to the embodiment of the present disclosure, a plurality of rotation protrusions 330 are formed to be spaced apart from each other on a rim of an upper surface of the valve body 300 or a lower surface thereof. The plurality of rotation protrusions 330 may be rotationally supported on an inner wall of the valve housing 200 when the valve body 300 rotates. This structure is formed to minimize a contact area between the valve housing 200 and the valve body 300 when the valve body 300 rotates, thereby reducing rotational friction of the valve body 300, regulating a rotational position of the valve body 300, and preventing stalling of the valve body 300.

Meanwhile, in the multi-way valve according to the embodiment of the present disclosure, the valve housing 200 includes a plurality of valve seals 400, provided on sides of the plurality of coolant inlet ports 10 or on an inner wall of the valve housing 200, in the inner space thereof. In embodiments, the plurality of valve seals 400 are spaced apart from each other along the inner wall of the valve housing 200, and are configured to be aligned with the plurality of inlet parts 310 when the valve body 300 rotates, thereby making it possible to prevent the coolant from flowing into the inner space of the valve housing 200.

Specifically, the valve seal 400 is provided in each of the plurality of coolant inlet ports 10 of the valve housing 200. Accordingly, when the coolant inlet port 10 is aligned with the inlet part 310 of the valve body 300, a coolant flows without leaking into the inner space of the valve housing 200. Further, when only one of the coolant inlet ports 10 is opened, the valve seal 400 is also formed on the inner wall of the valve housing 200 so that the coolant is prevented from flowing out of the inner wall of the valve housing 200 by any one of the inlet parts 310 of the valve body 300. In embodiments, when the inlet parts 310 of the valve body 300 are provided at an angular interval of about 120 degrees, two valve seals 400 are also formed in two coolant inlet ports 10 at an angular interval of 120 degrees, and one valve seal 400 is formed on the inner wall of the valve housing 200. In this case, the valve seals 400 are disposed at equal intervals of 120 degrees, thereby maintaining an equivalent repulsive force on the inner wall of the valve housing 200 and improving sealing performance.

Meanwhile, in the multi-way valve according to the embodiment of the present disclosure, the outlet part 320 of the valve body 300 may be formed to have a cross-sectional area larger than that of the coolant outlet port 20 in the valve housing 200. Additionally, in the multi-way valve according to the embodiment of the present disclosure, the outlet part 320 of the valve body 300 may have a central axis offset from the central axis of the coolant outlet port 20 of the valve housing 200. In this manner, it is possible to further improve a degree of freedom in design of the multi-way valve according to the embodiment of the present disclosure.

In addition, in the multi-way valve according to the embodiment of the present disclosure, the coolant inlet port 10 of the valve housing 200 includes a first inlet port and a second inlet port having a coolant flowing thereinto from one side thereof, and a third inlet port and a fourth inlet port having a coolant flowing thereinto from the other side thereof. The coolant outlet port 20 includes a first outlet port. In embodiments, the first inlet port, the second inlet port, the third inlet port, or the fourth inlet port may be selectively connected to the first outlet port by the rotation of the valve body 300. In embodiments, in addition to the case in which two coolant inlet ports 10 are provided at the upper portion of the valve housing 200, as shown in FIGS. 1 to 5, two ports may be additionally provided on the lower portion of the valve housing 200 as necessary, thereby implementing a coolant line having various ports and flow paths.

As a result, the multi-way valve according to the embodiment of the present disclosure may have various effects of reducing costs by applying a plurality of seals having the same shape, reducing costs by manufacturing a step using a single mold (no bonding), performing uniform surface pressure action of the seal by positioning the seal at an equal angle regardless of a port direction to eliminate concentration of force, improving durability of the seal, maintaining flow by preventing blockage due to the seal even if a port of a housing is not disposed on the same axis as the seal by increasing the inner diameter of the seal, reducing costs by manufacturing the housing using a single mold (no bonding/assembly), improving a degree of freedom in design by providing a stem outlet cross-sectional area larger than a housing outlet cross-sectional area so as to allow offset adjustment between outlet centers thereof, bleeding air from the entire circuit through a fully open mode in a structure in which each closed circuit is connected to opposite sides of the valve, improving air bleeding performance and ease of maintenance by performing coolant injection, and obviating a reservoir tank that would otherwise need to be additionally provided in order to bleed air from an existing closed circuit structure because the fully open mode allows the air to be bled from the entire circuit.

As is apparent from the above description, the present disclosure provides a multi-way valve including a valve housing including a plurality of inlet ports and an outlet port and a valve body configured to selectively connect the plurality of inlet ports to the outlet port by rotation thereof in an inner space of the valve housing. In embodiments, all of the plurality of inlet ports, each of which is connected to a closed circuit inside a vehicle, may be connected to the outlet port by the rotation of the valve body, thereby entering a fully open state. During the fully open state, it is possible to eliminate cavitation in a coolant line through a reservoir.

Although embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A multi-way valve comprising:
    a valve housing having an inner space formed therein, the valve housing comprising:
        a plurality of coolant inlet ports comprising a first inlet port, a second inlet port, a third inlet port and a fourth inlet port, formed to be spaced apart from each other along a side surface thereof; and
        a plurality of coolant outlet ports comprising a first coolant outlet and a second coolant outlet, formed to be penetrated along a central axis thereof orthogonal to the coolant inlet ports; and
    a valve body inserted into the inner space of the valve housing and configured to rotate around a rotation axis thereof coincident with or parallel to the central axis of the valve housing, the valve body comprising:
        a plurality of inlet parts comprising a first inlet part and a second inlet part, formed to be spaced apart from each other along a side surface thereof, and
        an outlet part formed along the rotation axis thereof, the plurality of inlet parts and the outlet part communicating with each other therein, the outlet part facing one of the plurality of coolant outlet ports to be constantly connected thereto, the plurality of inlet parts being selectively connected to the plurality of coolant inlet ports by rotation thereof around the rotation axis thereof,
    wherein the valve housing comprises:
        a first housing comprising the first inlet port, the second inlet port, and the first outlet port formed therein, and
        a second housing comprising the third inlet port, the fourth inlet port, and the second outlet port formed therein.

2. The multi-way valve according to claim 1, wherein the first inlet port and the first outlet port are configured to be connected to a first closed circuit that is configured to allow a coolant flowing out through the first outlet port to flow into the valve housing through the first inlet port, and wherein the second inlet port and the first outlet port are configured to be connected to a second closed circuit that is configured to allow the coolant flowing out through the first outlet port to flow into the valve housing through the second inlet port.

3. The multi-way valve according to claim 2, wherein the valve housing has any one of the first inlet port and the second inlet port connected to the first outlet port by the rotation of the valve body, or has both the first inlet port and the second inlet port connected to the first outlet port by the rotation thereof.

4. The multi-way valve according to claim 3, wherein the valve housing has any one of the first inlet port and the second inlet port connected to a coolant line, and cavitation in the coolant line is eliminated when both the first inlet port and the second inlet port are connected to the first outlet port.

5. The multi-way valve according to claim 1, wherein:
    the first inlet port, the second inlet port, and the first outlet port formed in the first housing are connected to a coolant line, and
    the third inlet port, the fourth inlet port, and the second outlet port formed in the second housing are connected to another coolant line.

6. The multi-way valve according to claim 1, wherein:
    each of the first inlet port and the second inlet port has a coolant flowing thereinto to the valve housing, and
    the first inlet part is opened toward the first inlet port, and the second inlet part is opened toward the second inlet port, around the outlet part of the valve body.

7. The multi-way valve according to claim 6, wherein:
    the valve body is fully opened when the first inlet part and the first inlet port are aligned with each other and the second inlet part and the second inlet port are aligned with each other, and
    one of the first inlet port and the second inlet port is selectively opened when the valve body rotates toward the first inlet port in a fully open state thereof so that the second inlet part is aligned with the first inlet port or rotates toward the second inlet port in the fully open state thereof so that the first inlet part is aligned with the second inlet port.

8. The multi-way valve according to claim 1, wherein:
    the valve body comprises a plurality of rotation protrusions, formed to be spaced apart from each other, on a rim of an upper surface thereof or a lower surface thereof, and
    the plurality of rotation protrusions are rotationally supported on the valve body.

9. The multi-way valve according to claim 1, wherein:
    the valve housing comprises a plurality of valve seals, provided on sides of the plurality of coolant inlet ports or on an inner wall thereof, in the inner space thereof, and
    the plurality of valve seals are spaced apart from each other along the inner wall of the valve housing, and are configured to be aligned with the plurality of inlet parts when the valve body rotates, thereby preventing a coolant from flowing into the inner space of the valve housing.

10. The multi-way valve according to claim 1, wherein the outlet part of the valve body is formed to have a cross-sectional area larger than a cross-sectional area of one of the plurality of coolant outlet ports of the valve housing.

11. The multi-way valve according to claim 1, wherein the outlet part of the valve body has a central axis offset from the central axis of one of the plurality of coolant outlet ports of the valve housing.

12. The multi-way valve according to claim 1, wherein:
the first inlet port and the second inlet port, have a coolant flowing thereinto from one side thereof, and the third inlet port and the fourth inlet port, having a coolant flowing thereinto from the other side thereof, and
the first inlet port and the second inlet port are selectively connected to the first outlet port by the rotation of the valve body, and the third inlet port and the fourth inlet port are selectively connected to the second outlet port by the rotation of the valve body.

13. A multi-way valve system for coolant of a vehicle, the system comprising:
the multi-way valve of claim 1;
a first closed circuit connected to the first inlet port and the first outlet port and configured to allow a coolant flowing out through the first outlet port to flow into the valve housing through the first inlet port; and
a second closed circuit connected to the second inlet port and the first outlet port and configured to allow the coolant flowing out through the first outlet port to flow into the valve housing through the second inlet port.

\* \* \* \* \*